Patented Feb. 23, 1932

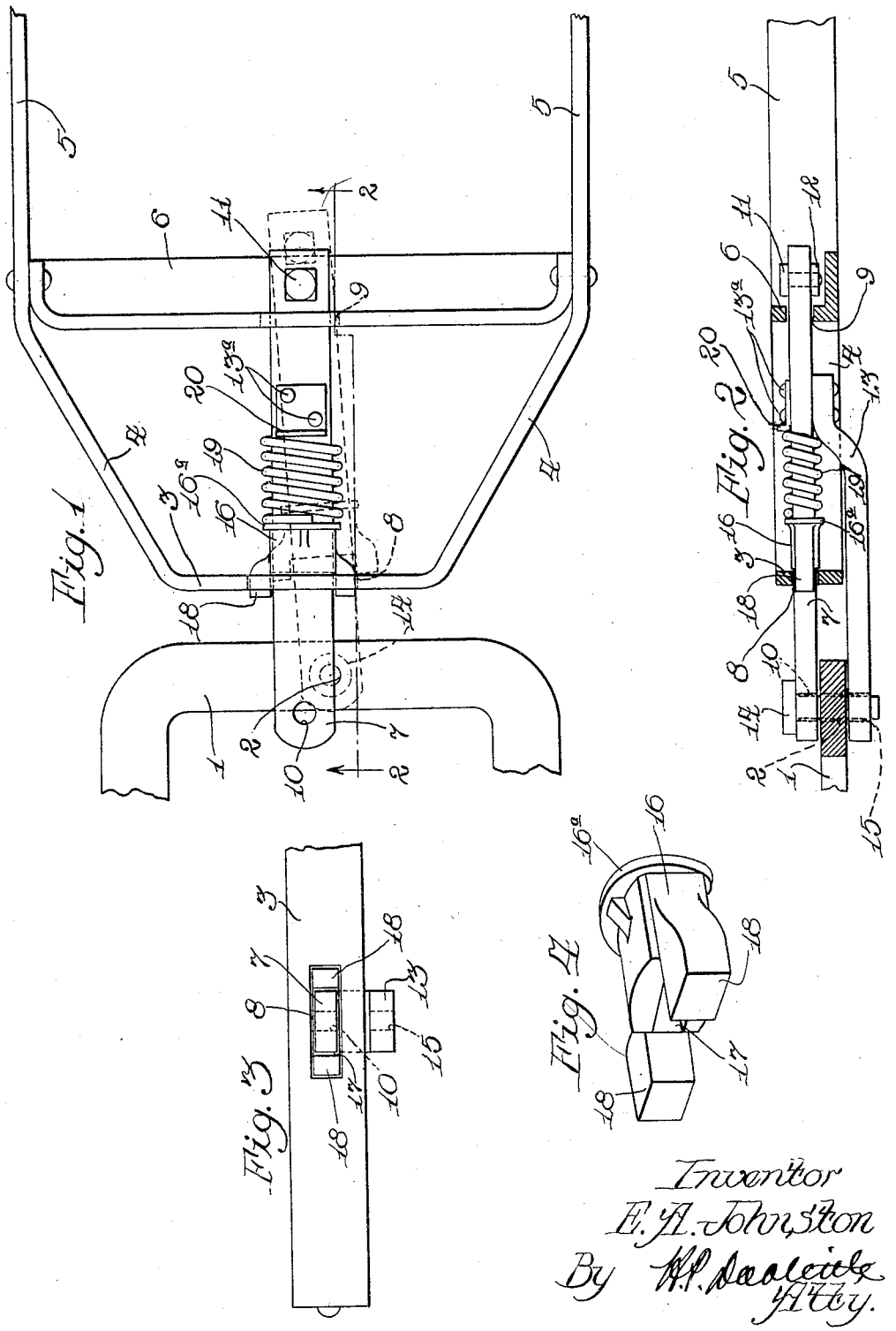

1,846,491

UNITED STATES PATENT OFFICE

EDWARD A. JOHNSTON, OF CHICAGO, ILLINOIS, ASSIGNOR TO INTERNATIONAL HARVESTER COMPANY, A CORPORATION OF NEW JERSEY

TRACTOR HITCH

Application filed March 24, 1930. Serial No. 438,325.

This invention relates to a coupling device. More particularly it relates to a hitch for securing an implement to a tractor drawbar.

The main object of the invention is to provide an improved hitch which may be adjusted laterally and longitudinally with respect to the line of the draft, for the purpose of making the adjustment of the hitch more easy. It is difficult to manipulate a tractor so as to bring the drawbar into the exact position for attaching the draft element of an implement to be pulled by the tractor. Oftentimes also the implement to be attached is of such a construction, or so loaded or positioned that difficulty is encountered in moving it sufficiently to bring the draft element into the exact position necessary for attaching it to a tractor drawbar. By the construction of the device of this invention, sufficient adjustment is provided to accomplish the object of the invention.

Referring to the drawings,

Figure 1 is a plan view showing the hitch of the invention and a portion of a tractor drawbar and a draft frame of an implement adapted to be drawn by a tractor;

Figure 2 is a cross section on the line 2—2 of Figure 1 modified to show the hitch in operatively connected position.

Figure 3 is a front elevation with drawbar removed; and,

Figure 4 is a perspective view of the locking member which forms an essential part of the hitch.

The drawbar 1 is of the conventional U-shape, although it may be of any construction. The drawbar is provided with a hole 2 for the connection of a coupling device. The coupling device or hitch of this invention is shown as embodied in a draft frame, the principal elements of which are shown in Figure 1. The draft frame may be a rigid extension from an implement frame.

The draft frame has a forward, transverse member 3 having angularly extending, rearward portions 4 from each end thereof and longitudinally extending portions 5 joined to the rearward ends of the portions 4. A member 6 extends transversely and is rigidly secured to the forward ends of the portions 5.

A draft element 7 in the form of a flat, rectangular bar extends through aligned slots 8 and 9 formed respectively in the members 3 and 6. In the vertical dimensions, the slots 8 and 9 are of a width sufficient to permit free sliding of the draft element 7. The forward slot 8 in the member 3 is substantially longer than the width of the draft element 7. The rear slot 9 in the member 6 is only slightly longer than the width of the element 7, its length being sufficient to allow the forward end of the draft element to be moved laterally from end to end of the slot 8 without binding in the slot 9.

A hole 10 provided in the forward end of the draft element 7 provides means for attaching said element to the drawbar of the tractor. A bolt 11 extending through the rear end of the draft element 7 and a nut 12 provide a stop at the rear end of the draft element.

An auxiliary draft element 13 is secured to the draft element 7 intermediate the members 8 and 9 by rivets 13$^a$. The element 13 extends downwardly from its point of attachment and parallel to the element 7, whereby it clears the member 8. The draft elements 7 and 13 are spaced to fit on opposite sides of the drawbar 1. A pin 14 extending through the hole 10 in the draft element 7, the hole 2 in the drawbar 1 and a hole 15 in the auxiliary draft element 13 secures said elements to a drawbar. A locking member 16 shown in perspective in Figure 4 is provided with a bore 17 rectangular in cross section and of a size such that said member will slide freely on the draft element 7. The member 16 is provided with a lateral flange 17 at one end and a pair of diametrically opposed lugs 18 at its forward end. The lugs 18 are of a size and shape to fit between the edges of the member 7 and the ends of the slot 8 with the member 7 centrally located in said slot. A compression spring 19 is mounted around the element 7 with one end abutting the flange 17 of the locking member and the other end abutting the portion of the auxiliary draft element 13 adjacent the element 7, and a bracket 20 secured to the element 7 by the same rivets 14 which secure the auxiliary draft element thereto.

In the operation of this device a drawbar, as shown in Figure 1, is brought into proximity with the end of the draft element with the hole 2 in the drawbar within the zone in which the end of the draft element 7 can be manipulated. The locking member 16 is then manually pulled back against the action of the spring 19 until the lugs 18 are withdrawn from the slot 8 a sufficient distance to permit lateral movement of the element 7 in the direction desired. The element 7 may also be moved rearwardly for longitudinal adjustment to align the hole 10 in its forward end with the hole 2 in the drawbar. When the holes are in alignment, the pin 14 is inserted through the draft element and the drawbar. Draft may then be applied to the drawbar. The draft element 17 will be pulled forwardly until the stop 11 comes into contact with the member 6. Draft will then be applied through the member 6 to the extensions 5 and 2 and the implement to which said extensions are attached. As soon as the draft element 6 is moved angularly, due to turning of the tractor or straightening up of the trailing implement until the draft element becomes centrally located in the slot 8, the lugs 18 will be pushed forwardly by the action of the spring 19. The lugs 18 fit snugly between the ends of the slot 8 and the edges of the draft element 7, thereby holding said element substantially rigid with respect to the member 3. As the slot 9 in the rear member 6 is only slightly longer than the width of the draft element, there will be substantially no movement of the draft element with respect to the draft frame.

Although one particular embodiment of the invention has been illustrated and described, it is to be understood that applicant intends to limit his invention only by the scope of the appended claims.

What is claimed as new is:

1. A coupling device for a frame structure carrying a transversely extending member comprising a draft element extending longitudinally across said member, said member being formed to provide for limited lateral movement of said element, means adapted to lock said element in one position against lateral movement with respect to said member, said means being manually releasable, means automatically operable to lock said element when the locking position is reached, and means provided on said element to engage the frame structure upon movement of said element in one longitudinal direction.

2. A hitch for a frame structure having two substantially parallel transversely extending members comprising a draft element extending across said members, one of said members being formed to provide for lateral movement of the element with respect thereto, the second member being formed to hold said element against lateral movement and to provide for pivotal movement, means carried by said element adapted to engage one of said members upon longitudinal movement in one direction, means for locking said element in one position against lateral movement with respect to the first named element, said means being manually releasable, and means operable to automatically lock said element when the locking position is reached.

3. A hitch comprising two substantially parallel members rigidly mounted with respect to each other, aligned slots in said members, a draft element extending transversely of said members and through said slots, one slot being substantially longer than the width of said draft element, a stop on said element adapted to abut one of said members when draft is applied to the element, a locking member adapted to hold the draft element against lateral movement in the longer slot, said member including portions adapted to fit between the draft element and the ends of the slot with the bar intermediate said ends, and means for disengaging said locking member.

4. In a coupling device, a frame structure having two substantially parallel members, aligned slots in said members, a draft bar extending through said slots, a stop at one end of said bar positioned and adapted to abut one of said frame members when draft is applied to the other end of the bar, the slot adjacent the draft end being substantially longer than the width of the bar, a locking member longitudinally slidable on the bar, a pair of lugs carried by said member and adapted to fit between the draft bar and the respective ends of said longer slot, and means to hold said locking member in position.

5. In a coupling device, a frame structure having two spaced transversely extending members, aligned slots in said members, a coupling element extending through said slots, one of said slots being of a length substantially greater than the width of the coupling element, the other slot being sufficiently longer than the width of the coupling element to provide for angular movement of the coupling element in the first mentioned slot, means for attaching one end of the coupling element to a draft applying means, a stop on said element adapted to abut against one of the transversely extending members, a locking member carried on and slidable with respect to the coupling element, integral lugs extending from said member, said lugs being positioned and shaped to fit between the coupling element and the respective ends of the long slot, thereby holding said element in a substantially rigid position with respect to the frame structure, and means for resiliently holding the locking member in position.

6. In a coupling device having two spaced transversely extending members, a slot in one of said members, a coupling element slidably extending through said slot, means on said element engageable with the second member to limit movement of the element with respect thereto in one direction, said slot being of a length substantially greater than the width of the coupling element whereby said member may be moved laterally in the slot, and a locking member slidable with respect to the coupling element, said locking member carrying a pair of lugs adapted to extend in the slot on opposite sides of the coupling element whereby said element is held against lateral movement.

In testimony whereof I affix my signature.

EDWARD A. JOHNSTON.